United States Patent
Lee et al.

(10) Patent No.: US 12,510,647 B2
(45) Date of Patent: Dec. 30, 2025

(54) RADAR CONTROL DEVICE AND METHOD

(71) Applicant: HL KLEMOVE CORP., Incheon (KR)

(72) Inventors: Jingu Lee, Gyeonggi-do (KR); Jung Hwan Choi, Seoul (KR)

(73) Assignee: HL KLEMOVE CORP., Incheon (KR)

( * ) Notice: Subject to any disclaimer, the term of this patent is extended or adjusted under 35 U.S.C. 154(b) by 419 days.

(21) Appl. No.: 17/947,026

(22) Filed: Sep. 16, 2022

(65) Prior Publication Data

US 2023/0266455 A1 Aug. 24, 2023

(30) Foreign Application Priority Data

Feb. 24, 2022 (KR) .......................... 10-2022-0024459

(51) Int. Cl.
*G01S 13/52* (2006.01)
*G01S 7/41* (2006.01)
*G01S 13/931* (2020.01)

(52) U.S. Cl.
CPC .............. *G01S 13/52* (2013.01); *G01S 7/415* (2013.01); *G01S 13/931* (2013.01)

(58) Field of Classification Search
CPC ........ G01S 13/52; G01S 7/415; G01S 13/931; G01S 13/584; G01S 13/583; G01S 7/2927; G01S 7/356; G01S 13/60; G01S 13/89; B60W 40/02; B60W 2420/408; B60W 2554/20; B60W 2554/40

See application file for complete search history.

(56) References Cited

U.S. PATENT DOCUMENTS

2021/0011146 A1* 1/2021 Bialer ................... G01S 13/343

FOREIGN PATENT DOCUMENTS

| CA | 2816227 A1 | * | 1/2014 | |
|---|---|---|---|---|
| CN | 111033311 A | * | 4/2020 | ........... G01S 13/583 |
| EP | 2 952 926 | | 12/2015 | |
| EP | 3805784 A1 | * | 4/2021 | |
| JP | 2015-81886 | | 4/2015 | |
| JP | 2015081886 A | * | 4/2015 | |
| JP | 2019-45365 | | 3/2019 | |

OTHER PUBLICATIONS

Office Action dated Oct. 2, 2024 for Korean Patent Application No. 10-2022-0024459 and its English translation provided by Applicant's foreign counsel.

* cited by examiner

*Primary Examiner* — Vladimir Magloire
*Assistant Examiner* — Ashley Brown Raynal
(74) *Attorney, Agent, or Firm* — WOMBLE BOND DICKINSON (US) LLP

(57) ABSTRACT

The embodiments relate to a radar control device and method. Specifically, a radar control device according to the embodiments may include a transceiver configured to transmit a transmission signal for detecting surroundings of a host vehicle through a radar mounted on the host vehicle and receive a reflected reception signal, a calculator configured to calculate a measurement value reflected from an object by performing Fast Fourier Transform (FFT) on the reception signal and calculate a relative speed with respect to the measurement value, and a determiner configured to create, if the relative speed of the measurement value is 0, a peak map having a range-Doppler index from the reception signal, and determine whether the object is a stationary object based on the peak map.

8 Claims, 10 Drawing Sheets

RADAR CONTROL DEVICE AND METHOD

CROSS REFERENCE TO RELATED APPLICATION

This application claims priority from Korean Patent Application No. 10-2022-0024459, filed on Feb. 24, 2022, which is hereby incorporated by reference for all purposes as if fully set forth herein.

TECHNICAL FIELD

The embodiments of the present disclosure relate to a radar control device and method for estimating an object.

Recently, the number of vehicles equipped with radar is increasing. An electronic control unit of the vehicle may calculate the distance, relative speed, and angle between the host vehicle and an object around the host vehicle based on the information output from the radar mounted on the vehicle.

The vehicle equipped with a radar may provide various safety functions or convenience functions by using the distance, relative speed, and angle between the host vehicle and an object around the host vehicle.

For example, by using information input from a radar mounted on the vehicle to determine the distance, angle, or relative speed between a host vehicle and an object around the host vehicle, there may be performed a collision avoidance function during parking and stopping, a smart cruise function while driving, or an automatic parking function.

Since the radar mounted on the vehicle plays an important role to perform various functions, the reliability of the information input from the radar is also important. However, since a lateral radar sensor or a corner radar sensor cannot determine whether an object, which is orthogonal to the traveling direction of the vehicle with the radar, is stationary or is moving, the accuracy and reliability of the radar device may be deteriorated.

Accordingly, there is a demand for research and development on the determination of the mobility of an object located in a direction orthogonal to the radar.

SUMMARY

In this background, embodiments of the present disclosure provide a radar control device and method capable of generating a peak map having a velocity-distance component or a range-Doppler component from a reception signal and determining whether an object detected at a vertical angle is a stationary object by quantifying the velocity component.

In an aspect of the present disclosure, there is provided a radar control device including a transceiver configured to transmit a transmission signal for detecting surroundings of a host vehicle through a radar mounted on the host vehicle and receive a reflected reception signal, a calculator configured to calculate a measurement value reflected from an object by performing Fast Fourier Transform (FFT) on the reception signal and calculate a relative speed with respect to the measurement value, and a determiner configured to create, if the relative speed of the measurement value is 0, a peak map having a range-Doppler index from the reception signal, and determine whether the object is a stationary object based on the peak map.

In another aspect of the present disclosure, there is provided a radar control method including transmitting a transmission signal for detecting surroundings of a host vehicle through a radar mounted on the host vehicle and receiving a reflected reception signal, calculating a measurement value reflected from an object by performing Fast Fourier Transform (FFT) on the reception signal and calculating a relative speed with respect to the measurement value, and creating, if the relative speed of the measurement value is 0, a peak map having a range-Doppler index from the reception signal, and determining whether the object is a stationary object based on the peak map.

According to embodiments of the radar control device and method according to the present disclosure, by determining whether an object with a detection angle of 90 degrees is a stationary object or a moving object, it is possible to solve the misrecognition problem of the sensor, thereby improving the radar performance.

DETAILED DESCRIPTION

Figure 1:
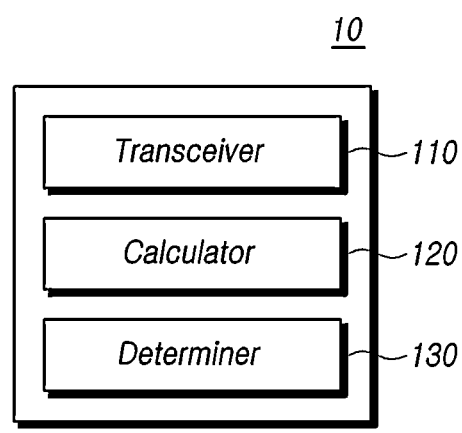
FIG. 1 is a block diagram illustrating a radar control device according to an embodiment of the present disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

FIG. 1 is a block diagram illustrating a radar control device 10 according to an embodiment of the present disclosure.

A radar control device 10 according to an embodiment of the present disclosure may include a transceiver 110, a calculator 120 and a determiner 130.

The radar control device 10 may receive a reception signal from the radar and perform an FFT on the reception signal to calculate a measurement value of a signal reflecting at the object. If the relative speed with the calculated measurement value is 0, the radar control device may create a peak map having a range-Doppler component or a distance-speed component in the reception signal to determine whether objects detected in the vicinity are moving objects or stationary objects.

To this end, the radar control device 10 may transmit/receive data to and from the radar mounted in the host vehicle 20 through CAN (Controller Area Network) communication, Flexray, or the like.

The radar control device 10 according to an embodiment of the present disclosure may be an advanced driver assistance systems (ADAS) which is mounted on a host vehicle 20 and provides information to assist the driving of the host vehicle 20 or provides assistance to the driver in controlling the host vehicle 20.

Here, ADAS may refer to various types of advanced driver assistance systems, and examples of the driver assistance systems may include, for example, an autonomous emergency braking (AEB), a smart parking assistance system (SPAS), a blind spot detection (BSD) system, an adaptive cruise control (ACC) system, a lane departure warning system (LDWS), a lane keeping assistance System (LKAS), a lane change assistance system (LCAS), and the like. However, the present disclosure is not limited thereto.

The radar control device is mounted on the host vehicle 20 and can detect objects such as vehicles and traffic lights in the vicinity of the host vehicle 20 based on a measurement value calculated by transmitting and receiving a transmission signal and a reception signal through the radar.

Here, the host vehicle may refer to a vehicle capable of moving on the ground without using a railroad or a built-in line by mounting a prime mover and rolling wheels with the power. The host vehicle may be an electric vehicle which is powered by electricity, and obtains driving energy by rotating a motor with electricity accumulated in a battery rather than obtaining driving energy from combustion of fossil fuels.

The radar control device 10 may be applied to a manned vehicle controlled by a driver of the host vehicle or an autonomous vehicle that automatically travels without driver intervention.

The transceiver 110 may transmit a transmission signal to the vicinity of the host vehicle 20 and receive a reception signal in which the transmission signal is reflected by an object.

Here, the radar may include an antenna unit, a transmitter and a receiver.

Specifically, the antenna unit may include one or more transmission antennas and one or more receiving antennas, and each transmission/receiving antenna may be an array antenna in which one or more radiating elements are connected in series by a feed line, but is not limited thereto.

The antenna unit may include a plurality of transmission antennas and a plurality of receiving antennas, and may have various types of antenna array structures according to an arrangement order and an arrangement interval thereof.

The transmitter may provide a function of transmitting a transmission signal through a switched transmission antenna by switching to one of a plurality of transmission antennas included in the antenna unit or transmitting a transmission signal through a multi-transmission channel allocated to the plurality of transmission antennas.

The transmitter may include an oscillator for generating a transmission signal for one transmission channel allocated to the switched transmission antenna or multi-transmission channels allocated to a plurality of transmission antennas. The oscillator may include, for example, a voltage-controlled oscillator (VCO) and an oscillator.

The receiver may receive a reception signal received by being reflected from an object through a receiving antenna.

In addition, the receiver may provide a function of receiving a reception signal, which is a reflection signal of the transmission signal reflected by a target, through the switched receiving antenna by switching to one of a plurality of receiving antennas, or a function of receiving a reception signal through multi-receiving channels allocated to a plurality of receiving antennas.

The receiver may include a low-noise amplifier (LNA) for low-noise amplification of a reception signal received through one receiving channel allocated to the switched receiving antenna or received through a multi-receiving channel allocated to a plurality of receiving antennas, a mixer for mixing the low-noise amplified reception signal, an amplifier for amplifying the mixed reception signal, and a converter (e.g., an analog digital converter) for digitally converting the amplified reception signal to generate reception data.

In addition, the transceiver 110 of the radar control device 10 may receive a reception signal and may receive digitally converted reception data.

The calculator 120 may calculate a measurement value reflected from an object by performing Fast Fourier Transform (FFT) on the reception signal, and calculate a relative speed with respect to the measurement value.

Specifically, the calculator 120 may calculate a measurement value by performing Fast Fourier Transform (FFT) on the reception signal. Specifically, a first-order FFT may be performed to convert a frequency to a distance-time index, and a second-order FFT may be performed to time to convert to a range-Doppler index, so that the measurement value may be calculated.

The calculator 120 may calculate a measurement value by performing a Fast Fourier Transform (FFT) on the reception signal, and may calculate a relative speed with respect to at least one measurement value calculated in a field of view (FOV) of the radar.

Figure 2:
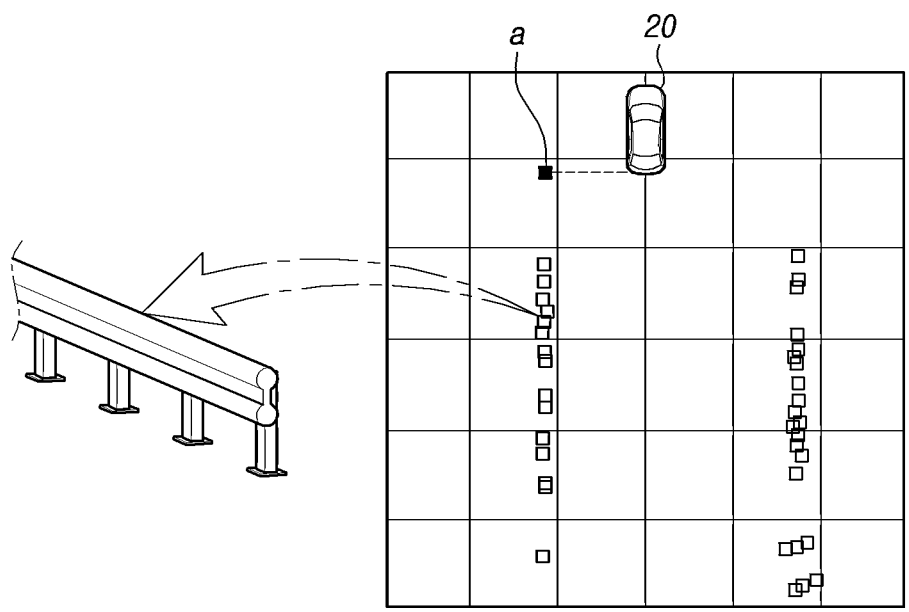
FIGS. 2 and 3 are diagrams for explaining that the relative speed is calculated as 0 in the case that the detection angle of the sensor mounted on a host vehicle is 90 degrees, according to an exemplary embodiment.
Figure 3:
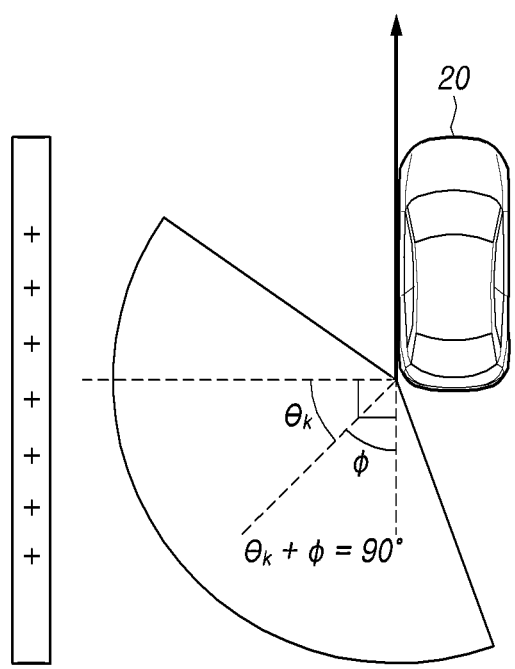

FIGS. 2 and 3 are diagrams for explaining that the relative speed is calculated as 0 in the case that the detection angle of the sensor mounted on a host vehicle 20 is 90 degrees, according to an exemplary embodiment.

FIG. 2 is a plan view showing the result of the calculator 120 calculating the measurement value based on the reception signal received while the host vehicle 20 is travelling.

In the case of FIG. 2, the radar control device 10 may determine that the measurement value is measured from a reception signal reflected by a stationary object based on the position of the measurement value and the relative speed between the measurement value and the host vehicle 20, and may determine that this stationary object is a stationary object, such as a guard rail.

Referring to FIG. 3, in the case that the host vehicle 20 is traveling on a road on which a guard rail exists, if the transceiver 110 receives the reception signal reflected at a point forming 90 degrees with the radar mounted on the host vehicle 20 as shown at 'a' in FIG. 2A, the relative speed of the measurement value calculated from the reception signal with respect to the host vehicle 20 may be calculated as 0 according to Equation 1 below.

$$V_k = V_{ego} * \cos(\theta_k + \varphi)$$ [Equation 1]

Here, $\varphi$ may mean a mounting angle of the radar, $\theta k$ may mean a detection angle of the radar, and $V_{ego}$ may mean the speed of the host vehicle 20.

If the relative speed of the measurement value is 0, the determiner 130 may create a peak map having a range-Doppler index from the reception signal, and may determine whether the object is a stationary object based on the peak map.

If the determination of the object becomes ambiguous since the relative speed is calculated as 0 even though an object is stationary, in the case that the host vehicle 20 is stopped, there is no problem since the reception signal reflected from the surrounding guard rail is determined to have the relative speed of 0. However, if the host vehicle 20 is driving, the object detected at 90 degrees is determined to be a moving object, and thus there may increase the possibility of erroneous determination on the object. Therefore, due to the object detected at 90 degrees, the function of the ADAS based on radar detection may not be performed properly, and the reliability of the ADAS function may decrease.

Accordingly, the radar control device according to the present disclosure may determine whether a corresponding object is a stationary object or a moving object by creating a peak map having a range-Doppler index from a reception signal.

Figure 4:
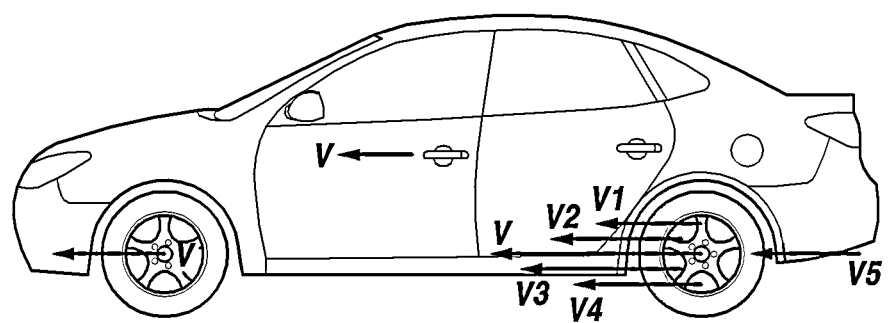
FIG. 4 is a diagram for explaining a wheel Doppler according to an embodiment.

FIG. 4 is a diagram for explaining a wheel Doppler according to an embodiment.

Referring to FIG. 4, if the vehicle of FIG. 4 travels, the center of wheel or the vehicle body may have the same speed V. However, there can be seen that the position away from the center of the wheel, such as the outer circumferential surface of the wheel, rotates at different speeds (V1, V2, V3, V4, V5) from the center of the wheel.

In the present disclosure, it is possible to determine whether the object detected at 90 degrees is a stationary object by using the speed difference.

Specifically, the determiner 130 may perform FFT on the reception signal to calculate a 2D distance-velocity spectrum (i.e., range-Doppler Spectrum), and again perform Peak extraction (or target detection) algorithm for the distance-velocity spectrum to detect the target frequency signal of the object. The determiner 130 may create a range-Doppler peak map based on the detected target frequency signal. This range-Doppler peak map may have a value of 1 if an object is found, otherwise 0 (Target detection point, detection=1, none=0).

Here, the determiner 130 may create a peak map by performing a CFAR (Constant False Alarm Rate) algorithm on the reception signal. In addition, the present disclosure may use a local-max method that is not limited to the above-described CFAR method in creating the range-Doppler peak map, and is not limited to a specific method if the range-Doppler peak map can be created.

Figure 5:
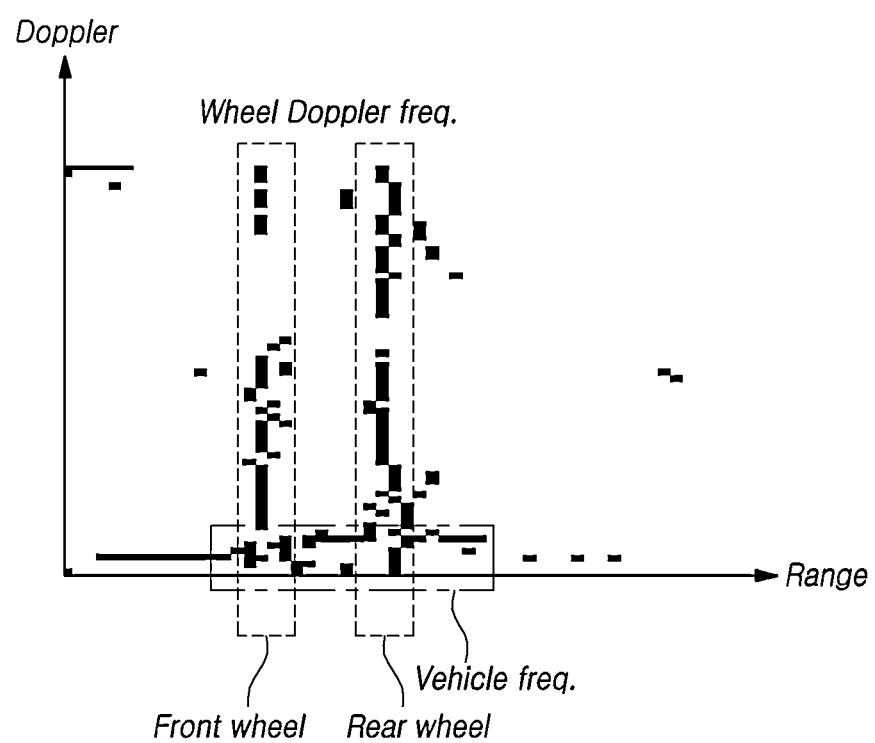
FIG. 5 is a diagram for explaining a range-Doppler peak map according to an embodiment.

FIG. 5 is a diagram for explaining a range-Doppler peak map according to an embodiment.

The calculator 120 may create a range-Doppler peak map (or a distance-velocity peak map) for the target frequency signal as shown in FIG. 5 based on the 2D range-Doppler spectrum.

Referring to FIG. 5, if an object calculated with a relative speed of 0 is a vehicle, it may be calculated as shown in FIG. 5 at a specific frequency. Specifically, the speed of the frequency section corresponding to the vehicle may be calculated to be low, but the speed may be calculated to be high in a specific part. In the case that the object is a moving object such as a vehicle, a peak map as shown in FIG. 5 may be created by calculating different speeds as the front wheel and the rear wheel rotate.

That is, there may be occurred a portion having a speed different from that of the moving vehicle body.

Accordingly, the calculator 120 may determine whether the object calculated with the relative speed 0 is a moving object based on the speed of the specific part of the object.

Figure 6:
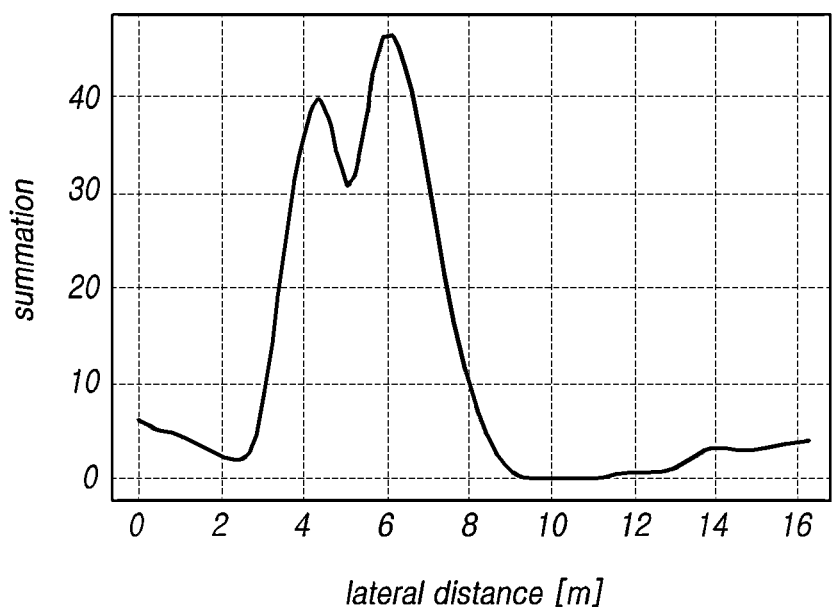
FIG. 6 is a diagram for explaining a result of quantifying a range component in the range-Doppler peak map of FIG. 5 according to an embodiment.

FIG. 6 is a diagram for explaining a result of quantifying a range component in the range-Doppler peak map of FIG. 5 according to an embodiment.

Referring to FIG. 6, the determiner 130 may quantify a speed component (i.e., a Doppler component) in order to extract wheel Doppler and may calculate a quantified value corresponding to a range component or a distance component. The determiner 130 may determine whether the object is a stationary object based on the quantified value.

Specifically, the quantified value of the speed component or a Doppler component may be calculated to be high in a section of about 4 meters to 8 meters. Since a non-zero speed is detected in this section, the determiner 130 may determine that an object having a relative speed of 0 is a moving object.

As described above, the determiner 130 may set a range region for the range component, and determine whether the object is a stationary object based on a quantified value corresponding to the range component within the range region.

Figure 7:
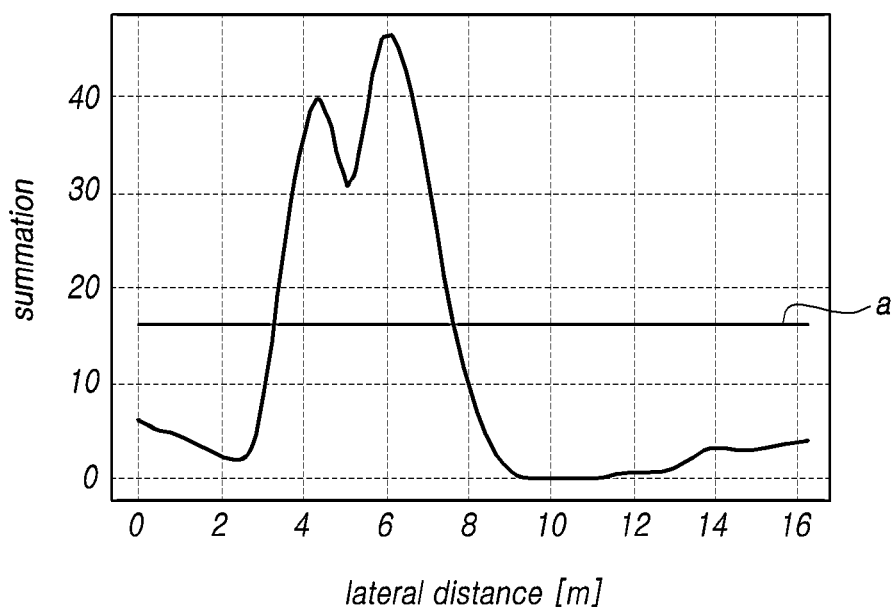
FIG. 7 is a diagram for explaining determining whether an object is a moving object based on quantified values greater than or equal to a threshold by setting a threshold according to an exemplary embodiment.

FIG. 7 is a diagram for explaining determining whether an object is a moving object based on quantified values greater than or equal to a threshold by setting a threshold according to an exemplary embodiment.

Referring to FIG. 7, the determiner 130 may determine whether the object is a stationary object based on values greater than or equal to a threshold value among quantified values.

Here, the threshold as shown in a of FIG. 7 may be set as an average value of quantified values corresponding to range components. In addition, the threshold value may be set by multiplying an average value of the quantified values by a weight according to vehicle characteristics and road characteristics.

Since the quantified value lower than the threshold value means that a movement differentiated from the object is not detected even when the frequency of the target is detected while performing the CFAR algorithm, the determiner 130 may determine that the object is highly likely to be a stationary object.

Figure 8:
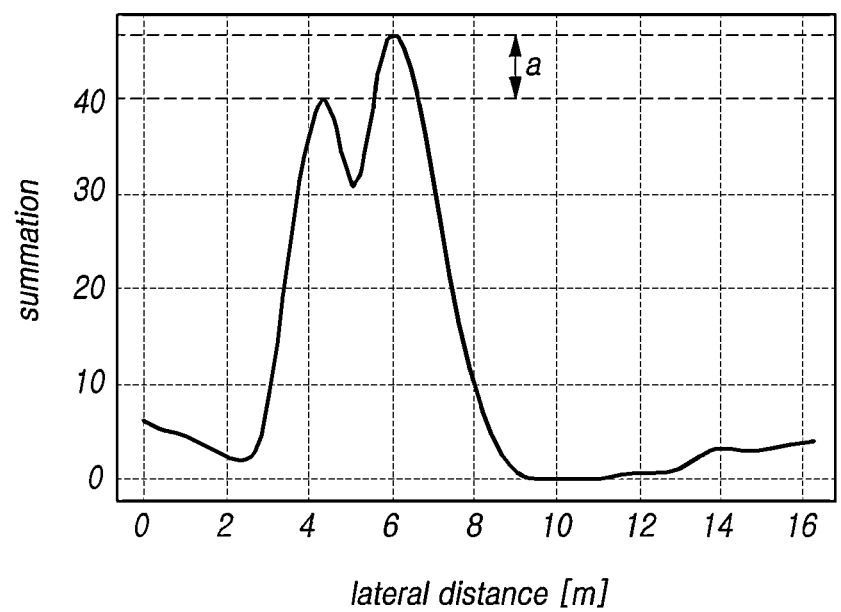
FIG. 8 is a diagram for explaining determining whether an object is a stationary object based on a difference between peak values when a plurality of peak values of a quantified value are calculated according to an exemplary embodiment.

FIG. 8 is a diagram for explaining determining whether an object is a stationary object based on a difference between peak values when a plurality of peak values of a quantified value are calculated according to an exemplary embodiment;

Referring to FIG. 8, if a first quantified value has a plurality of peak values, the determiner 130 may determine that the object is a moving object. In addition, if there are two peak values and the difference between the two peak values is equal to or less than a predetermined value, the determiner 130 may determine that the object is a moving object.

If a speed different from the overall moving speed of the object is detected in a part of the object and the corresponding object is a vehicle, as shown in FIG. 5, a portion with a different detected speed may be highly likely to be a wheel. Accordingly, since a vehicle object is travelling at a speed similar to that of the host vehicle 20, there may be estimated that the detected speeds of the front wheel and the rear wheel are the same. Accordingly, if the difference between the peak values of the detected quantified values is less than or equal to a predetermined value (i.e., 'a' of FIG. 8), the determiner 130 may determine that the object is a vehicle and may determine that the object is a moving object.

As described above, if an object having a radar detection angle of 90 degrees is detected, the radar control device 10 of the present disclosure can determine whether the corresponding object is a moving object or a stationary object, thereby reducing mis-detection of the radar and improving the performance of the radar.

The radar control device 10 may be implemented as an electronic control unit (ECU), a microcomputer, or the like.

For example, an electronic control unit (not shown) of the radar control device 10 may include at least one or more elements of one or more processors, memories, storage unit, user interface input unit and user interface output unit, which may communicate with each other via a bus. Furthermore, the electronic control unit may also comprise a network interface for connecting to the network. The processor may be a CPU or a semiconductor device that executes processing instructions stored in memory and/or storage unit. Memory and storage unit may include various types of volatile/non-volatile storage media. For example, memory may include ROM and RAM.

Hereinafter, it will be described a radar control method using the radar control device 10 capable of performing all of the above-described present disclosure.

Figure 9:
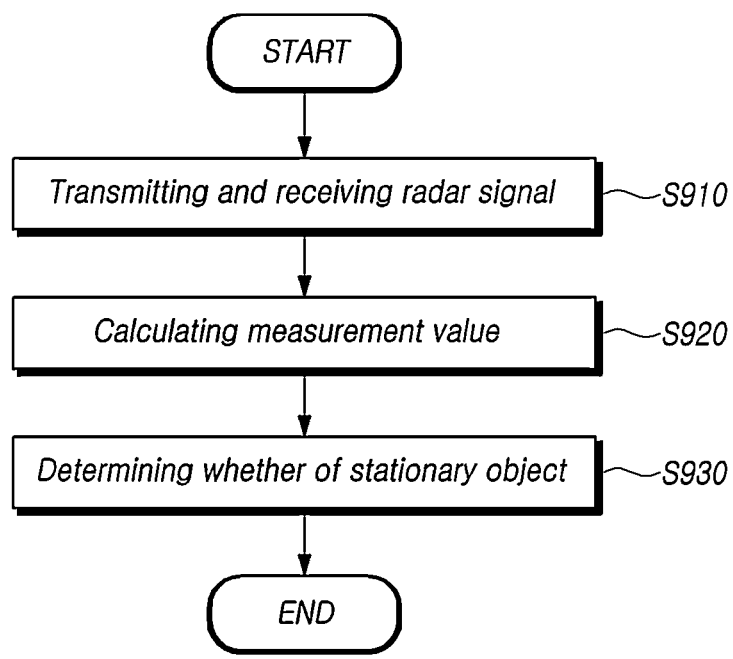
FIG. 9 is a flowchart illustrating a radar control method according to an embodiment of the present disclosure.

FIG. 9 is a flowchart illustrating a radar control method according to an embodiment of the present disclosure.

Referring to FIG. 9, the radar control method according to the present disclosure may include transmitting a transmission signal for detecting surroundings of a host vehicle 20 through a radar mounted on the host vehicle 20 and receiving a reflected reception signal (S910), calculating a measurement value reflected from an object by performing Fast Fourier Transform (FFT) on the reception signal and calculating a relative speed with respect to the measurement value (S920), and creating, if the relative speed of the measurement value is 0, a peak map having a range-Doppler index from the reception signal, and determining whether the object is a stationary object based on the peak map (S930).

The determining whether the object is a stationary object (S930) may include quantifying a Doppler component and calculating a quantified value corresponding to a range component, and determining whether the object is a stationary object based on the quantified value.

The determining whether the object is a stationary object (S930) may include setting a range region for the range component, and determining whether the object is a stationary object based on the quantified value corresponding to the range component within the range region.

Figure 10:
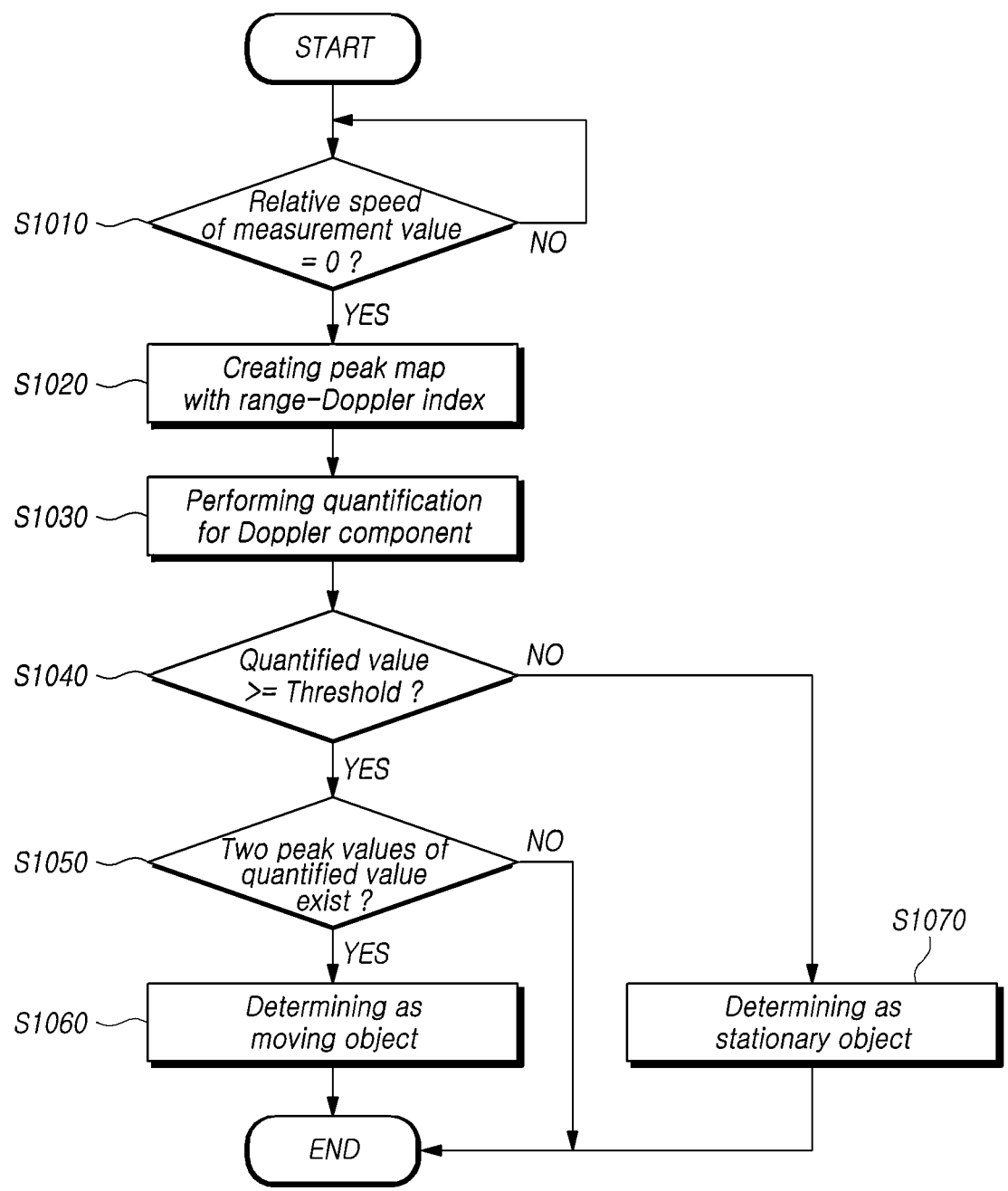
FIG. 10 is a diagram for describing step S930 in more detail according to an exemplary embodiment.

FIG. 10 is a diagram for describing step S930 in more detail according to an exemplary embodiment.

Referring to FIG. 10, the radar control device 10 may determine whether the relative speed between the measurement value calculated from the reception signal and the host vehicle 20 is 0 (S1010).

Here, if the relative speed between the measurement value and the host vehicle is not 0 (NO in S1010), the relative speed may be calculated according to Equation 1 described above, and whether of a stationary object may be determined according to the calculated relative speed. Therefore, the radar control device 10 may end the step of determining whether a stationary object is present, determine whether the relative speed of another measurement value is 0, or determine whether the relative speed of the measurement value calculated in the next radar detection period is 0.

In the case that the relative speed between the measurement value and the host vehicle is 0 (YES in S1010), the radar control device 10 may create a peak map having a range-Doppler index from the reception signal (S1020).

Specifically, the radar control device 10 may perform FFT on the reception signal to calculate a 2D range-Doppler spectrum, and perform a CFAR algorithm to extract a target frequency for an object, and may create a range-Doppler peak map based on the extracted target frequency.

According to the above-described peak map, there may be determined whether the speed of the object occurs in the corresponding distance. That is, in a situation where the relative speed of the measurement value reflected by the object is 0, if different speeds can be detected from other signals reflected by the object, there may be a basis for determining whether the object is a stationary object or a moving object.

The radar control device 10 may quantify the velocity component or the Doppler component of the peak map (S1030). If one speed value corresponding to the range value is determined to be 1 and quantification is performed by adding all the speed values detected from the specific range value, the speed detected at the specific range can be quantitatively determined.

The radar control device 10 may determine whether the object is a stationary object based on values greater than or equal to a threshold value among quantified values (S1040).

Here, the threshold value may be set as an average value of quantified values corresponding to range components in all the set sections of the range index.

In addition, the radar control device 10 may set a range region with respect to the range component, and determine whether the object is a stationary object based on a quantified value corresponding to the range component within the range region.

If the quantified value is equal to or greater than the threshold (YES in S1040), the radar control device 10 may determine whether there are two peak values of the quantified value corresponding to the range component (S1050).

If the quantified value has two peak values (YES in S1050), the radar control device 10 may determine that the corresponding object is a moving object (S1060).

For more accurate determination, the radar control device 10 may determine that the corresponding object is a moving object if a difference between the two peak values calculated from the quantified value is less than or equal to a predetermined value. In the normal case, since the moving object while maintaining a 90 degree measurement angle with the host vehicle 20 is a vehicle, if the target frequency is calculated and quantified for such a vehicle, the Doppler values for the front and rear wheels may be detected as shown in FIG. 5. In addition, if the vehicle is driven, the rotational speeds of the front wheel and the rear wheel are generally similar. Accordingly, if it is determined that there are two peak values and the difference between the two peak values is less than or equal to a predetermined value, the radar control device 10 may determine that the object is a moving object.

As described above, if the quantified value of the Doppler component or the speed component in the entire quantified distance section is less than or equal to a threshold (NO in S1040), the radar control device 10 may determine the corresponding object as a stationary object (S1070).

The above-described series of steps in FIG. 10 are performed only when the relative speed between the measurement value reflected by the object and the host vehicle 20 is 0, but this is only an example, and the steps in FIG. 10 may be continuously performed while the host vehicle 20 is traveling even if the relative speed is not calculated between the measurement value and the host vehicle 20.

As described above, according to the present disclosure, the radar control device 10 and the method may quantify the Doppler value using the wheel Doppler for an object whose relative speed is detected as 0, and may determine whether the object is a stationary object.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A radar control device comprising:
   a transceiver configured to transmit a transmission signal for detecting surroundings of a host vehicle through a radar mounted on the host vehicle and receive a reflected reception signal;
   a calculator configured to calculate a measurement value reflected from an object by performing Fast Fourier Transform (FFT) on the reception signal and calculate a relative speed with respect to the measurement value; and
   a determiner configured to create, if the relative speed of the measurement value is 0, a peak map having a range-Doppler index from the reception signal, and determine whether the object is a stationary object based on the peak map,
   wherein the determiner configured to:
   quantify a Doppler component and calculate a quantified value corresponding to a range component, and determine whether the object is a stationary object based on the quantified value,
   calculate the quantified value corresponding to the range component by adding all the speed values detected from a specific range value in the range component,
   determine that the object is a moving object if a speed different from an overall moving speed of the object is detected in a part of the object, the quantified value has two peak values greater than a threshold, and the difference between the two peak values is less than or equal to a predetermined value, and
   determine that the object is a stationary object if all of the quantified values corresponding to the range components is less than the threshold,
   wherein the threshold is set by multiplying an average value of the quantified values by a weight according to at least one of vehicle characteristics and road characteristics.

2. The radar control device of claim 1, wherein the determiner sets a range region for the range component, and determines whether the object is a stationary object based on the quantified value corresponding to the range component within the range region.

3. The radar control device of claim 1, wherein the determiner determines whether the object is a stationary object based on values greater than or equal to the threshold among the quantified values.

4. The radar control device of claim 1, wherein the determiner creates the peak map by performing a CFAR (Constant False Alarm Rate) algorithm on the reception signal.

5. A radar control method comprising:
   transmitting a transmission signal for detecting surroundings of a host vehicle through a radar mounted on the host vehicle and receiving a reflected reception signal;
   calculating a measurement value reflected from an object by performing Fast Fourier Transform (FFT) on the reception signal and calculating a relative speed with respect to the measurement value;
   identifying that the relative speed of the measurement value is 0, and
   creating, if the relative speed of the measurement value is 0, a peak map having a range-Doppler index from the reception signal, and determining whether the object is a stationary object based on the peak map, wherein the determining includes quantifying a Doppler component and calculating a quantified value corresponding to a range component, and determining whether the object is a stationary object based on the quantified value, wherein the quantified value corresponding to the range component is calculated by adding all the speed values detected from a specific range value in the range component, wherein the determining includes determining that the object is a moving object if a speed different from an overall moving speed of the object is detected in a part of the object, the quantified value has two peak values greater than a threshold, and the difference between the two peak values is less than or equal to a predetermined value, wherein the determining includes determining that the object is a stationary object if all of the quantified values corresponding to the range components is less than the threshold, and wherein the threshold is set by multiplying an average value of the quantified values by a weight according to at least one of vehicle characteristics and road characteristics.

6. The radar control method of claim 5, wherein the determining comprises setting a range region for the range component, and determining whether the object is a stationary object based on the quantified value corresponding to the range component within the range region.

7. The radar control method of claim 5, wherein the determining comprises determining whether the object is a stationary object based on values greater than or equal to the threshold among the quantified values.

8. The radar control method of claim 5, wherein the determining comprises creating the peak map by performing a CFAR (Constant False Alarm Rate) algorithm on the reception signal.

* * * * *